(12) United States Patent
Eberle

(10) Patent No.: US 11,574,091 B2
(45) Date of Patent: Feb. 7, 2023

(54) TECHNIQUES FOR RECOVERING FROM INTERSECTIONS

(71) Applicant: PIXAR, Emeryville, CA (US)

(72) Inventor: David Eberle, San Francisco, CA (US)

(73) Assignee: Pixar, Emeryville, CA (US)

( * ) Notice: Subject to any disclaimer, the term of this patent is extended or adjusted under 35 U.S.C. 154(b) by 964 days.

(21) Appl. No.: 15/727,436

(22) Filed: Oct. 6, 2017

(65) Prior Publication Data

US 2019/0108298 A1    Apr. 11, 2019

(51) Int. Cl.
*G06F 30/23*    (2020.01)
*G06T 13/00*    (2011.01)
*G06F 30/20*    (2020.01)
*G06F 111/20*   (2020.01)
*G06F 113/12*   (2020.01)

(52) U.S. Cl.
CPC .............. *G06F 30/23* (2020.01); *G06F 30/20* (2020.01); *G06T 13/00* (2013.01); *G06F 2111/20* (2020.01); *G06F 2113/12* (2020.01); *G06T 2210/21* (2013.01)

(58) Field of Classification Search
CPC ...... G06F 30/23; G06F 30/20; G06F 2111/20; G06F 2113/12; G06T 13/00; G06T 2210/21
See application file for complete search history.

(56) References Cited

U.S. PATENT DOCUMENTS

| | | |
|---|---|---|
| 5,594,856 A | 1/1997 | Girard |
| 5,892,691 A | 4/1999 | Fowler |
| 5,912,675 A | 6/1999 | Laperriere |
| 5,982,390 A | 11/1999 | Stoneking et al. |
| 6,144,385 A | 11/2000 | Girard |
| 6,326,963 B1 | 12/2001 | Meehan |
| 6,559,849 B1 | 5/2003 | Anderson et al. |

(Continued)

OTHER PUBLICATIONS

Baraff et al., Untangling Cloth, ACM Transactions on Graphics, Proceedings of ACM SIGGRAPH, vol. 22, No. 3, 2003, pp. 862-870 (Year: 2003).*

(Continued)

*Primary Examiner* — Boris Gorney
*Assistant Examiner* — Michael Edward Cocchi
(74) *Attorney, Agent, or Firm* — Kilpatrick Townsend & Stockton LLP

(57) ABSTRACT

Provided are methods, systems, and computer-program products for recovering from intersections during a simulation of an animated scene when a collision detection operation is active. For example, the collision detection operation can be selectively activated and deactivated during the simulation of one or more objects for a time step based on an intersection analysis, which can identify intersections of the one or more objects for the time step. Once the collision detection operation is deactivated, a collision response can apply one or more forces to intersecting portions of the one or more objects to eliminate the intersections of the one or more objects. For example, a portion of a cloth that is in a state of intersection can be configured such that the collision detection operation is not performed on the portion, thereby allowing the cloth to be removed from inside of another object by a collision response algorithm.

19 Claims, 8 Drawing Sheets

(56) References Cited

U.S. PATENT DOCUMENTS

| | | | |
|---|---|---|---|
| 6,657,629 | B2 | 12/2003 | Baraff et al. |
| 6,720,962 | B1 | 4/2004 | Alter |
| 6,738,065 | B1 | 5/2004 | Even-Zohar |
| 6,909,431 | B1 | 6/2005 | Anderson et al. |
| 7,385,603 | B2 | 6/2008 | Piponi |
| 7,911,469 | B1 | 3/2011 | Baraff |
| 8,436,861 | B1 | 5/2013 | Baraff |
| 2002/0118197 | A1 | 8/2002 | Baraff et al. |
| 2004/0075662 | A1 | 4/2004 | Baraff et al. |
| 2005/0159904 | A1 | 7/2005 | Loose et al. |
| 2006/0149516 | A1* | 7/2006 | Bond .................. A63F 13/577 703/6 |
| 2010/0211368 | A1* | 8/2010 | Grinspun .............. G06F 17/12 703/6 |

OTHER PUBLICATIONS

Baraff et al., Untangling Cloth, ACM Transactions on Graphics, Proceedings of ACM SIGGRAPH, vol. 22, No. 3, 2003, pp. 862-870.

U.S. Appl. No. 12/987,721, Final Office Action dated Feb. 29, 2012, 10 pages.

U.S. Appl. No. 12/987,721, Non-Final Office Action dated Sep. 28, 2011, 10 pages.

U.S. Appl. No. 12/987,721, Non-Final Office Action dated Jul. 20, 2012, 6 pages.

U.S. Appl. No. 12/987,721, Notice of Allowance dated Jan. 11, 2013, 18 pages.

U.S. Appl. No. 11/753,792, Final Office Action dated Oct. 6, 2010, 15 pages.

U.S. Appl. No. 11/753,792, Notice of Allowance dated Dec. 13, 2010, 13 pages.

U.S. Appl. No. 11/753,792, Non-Final Office Action dated Mar. 2, 2010, 12 pages.

An Introduction to Physically Based Modeling, SIGGRAPH 95, 22nd International Conferencing on Computer Graphics and International Techniques, Aug. 6-11, 1995, 161 pages.

CG Characters Dress for Success Thanks to Maya Cloth, PR Newswire. New York, ProQuest, Available online at: http://proquest.umi.com/pqdweb?did=32224280&sid=1&Fmt=3&clientId=19649&RQT=309&VName=PQD, Jul. 21, 1998, 2 pages.

Ascher et al., On the Modified Conjugate Gradient Method in Cloth Simulation, The Visual Computer, vol. 19, Nos. 7-8, 2002, pp. 1-6.

Baraff et al., Global Methods for Simulating Contacting Flexible Bodies, IEEE, May 25-28, 1994, pp. 1-12.

Baraff et al., Large Steps in Cloth Simulation, Proceedings of the 25th Annual Conference on Computer Graphics and Interactive Techniques, Jul. 19-24, 1998, pp. 43-54.

Berney et al., Stuart Little: A Tale of Fur, Costumes, Performances, and Integration: Breathing Real Life Into a Digital Character, SIGGRAPH 2000 Course Notes, ACM SIGGRAPH, Accessed from Internet at Dec. 16, 2003, 1 page.

Breen et al., Predicting the Drape of Woven Cloth Using Interacting Particles, Computer Graphics, 1994, 9 pages.

Bridson et al., Robust Treatment of Collisions, Contact and Friction for Cloth Animation, Computer Graphics, Jul. 23-26, 2002, 10 pages.

Carignan et al., Dressing Animated Synthetic Actors with Complex Deformable Clothes, Computer Graphics, Jul. 1, 1992, 6 pages.

Chadwick et al., Layered Construction for Deformable Animated Characters, ACM SIGGRAPH Computer Graphics-Special Issue: Proceedings of the 1989 ACM SIGGRAPH Conference, vol. 23, No. 3, Jul. 31-Aug. 4, 1989, pp. 243-252.

Choi et al., Stable but Responsive Cloth, Computer Graphics, 2002, pp. 604-611.

Cordier et al., Integrated System for Skin Deformation, MIRALab, University of Geneva, 2000, pp. 2-8.

Corider et al., Integrating Deformations Between Bodies and Clothes, The Journal of Visualization and Computer Animation, vol. 12, No. 1, 2001, pp. 45-53.

Derose et al., Subdivision Surfaces in Computer Animation, Computer Graphics, 1998, pp. 85-94.

Ebberhardt et al., A Fast, Flexible, Particle-System Model for Cloth Draping, IEEE Computer Graphics and Applications, vol. 16, Sep. 1996, pp. 52-59.

Gottschalk et al., OBBTree: A Hierarchical Structure for Rapid Interference Detection, Computer Graphics, 1996, pp. 171-180.

Krishnan et al., An Efficient Surface Intersection Algorithm Based on Lower Dimensional Formulation, ACM Transactions on Graphics, vol. 16, No. 1, Jan. 1997, pp. 74-106.

Lander, Skin Them Bones: Game Programming for the Web Generation, Game Developer Magazine, Available online at: http://www.gdmag.com, May 1998, pp. 11-16.

Lander, Slashing Through Real-Time Character Animation, Game Developer, Available online at: http://www.gdmag.com, Apr. 1998, pp. 13-16.

Meyer et al., Interactive Animation of Cloth-Like Objects in Virtual Reality, The Journal of Visualization and Computer Animation, vol. 12, 2001, pp. 1-12.

Patrikalakis, Surface-to-Surface Intersections, IEEE Computer Graphics and Applications, vol. 13, No. 1, Jan. 1993, pp. 89-95.

Popovic et al., Controlling Physics in Realistic Character Animation, ACM, vol. 43, No. 7, Jul. 2000, pp. 51-59.

Popovic et al., Interactive Manipulation of Rigid Body Simulations, ACM, Jul. 2000, pp. 209-217.

Popovic et al., Physically Based Motion Transformation, SIGGRAPH 99, Los Angeles, Aug. 8-13, 1999, pp. 1-10.

Provot, Deformation Constraints in a Mass-Spring Model to Describe Rigid Cloth Behavior, Graphics Interface, 1995, pp. 147-155.

Terzopoulos et al., Deformable Models, Visual Computer, vol. 4, No. 6, 1988, pp. 306-331.

Terzopoulos, Elastically Deformable Models, SIGGRAPH '87 Proceedings of the 14th annual conference on Computer graphics and interactive techniques, vol. 21, No. 4, Jul. 1987, pp. 205-214.

Thalmann et al., Virtual Clothes, Hair and Skin for Beautiful Top Models, IEEE, Jun. 24-28, 1996, pp. 132-141.

Volino et al., Versatile and Efficient Techniques for Simulating Cloth and Other Deformable Objects, Computer Graphics, 1995, pp. 137-144.

Watt et al., Advanced Animation and Rendering Techniques, ACM Press, 1992, pp. 418-420.

Westenhofer et al., Using Kinematic Clones to Control the Dynamic Simulation of Articulated Figures, Rhythm & Hues Studio, Los Angeles, CA, 1999, 60 pages.

* cited by examiner

State at time t+1 with a response to the detection

State at time t+1 with a detection of an intersection

State at time t

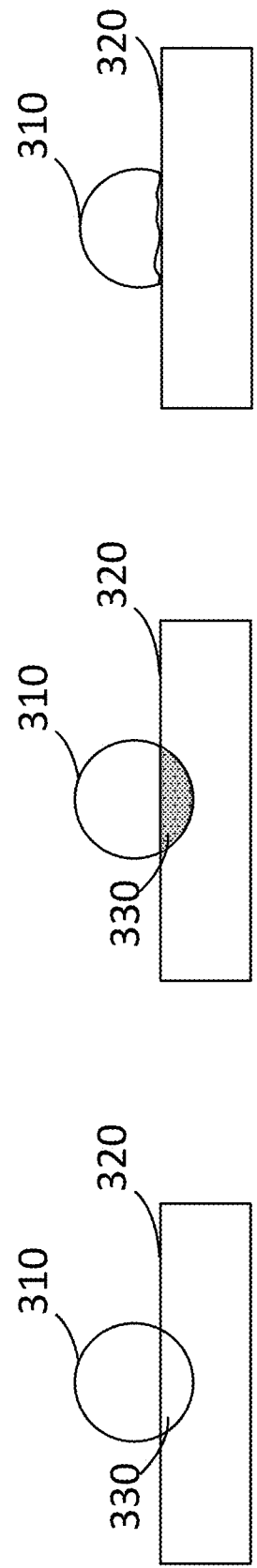

400

RECEIVE A POSITION OF A FIRST OBJECT AND A SECOND OBJECT AT A FIRST TIME
410

IDENTIFY AN INTERSECTING PORTION AT THE FIRST TIME, THE INTERSECTING PORTION INCLUDING A PORTION OF THE FIRST OBJECT THAT IS INTERSECTING A FIRST PORTION OF THE SECOND OBJECT
420

PERFORM A SIMULATION OF THE FIRST OBJECT FROM THE FIRST TIME TO A SECOND TIME, WHEREIN PERFORMING THE SIMULATION INCLUDES:
430

DEACTIVATE A COLLISION DETECTION OPERATION FOR THE FIRST PORTION OF THE SECOND OBJECT WITH RESPECT TO THE FIRST OBJECT AND THE PORTION OF THE FIRST OBJECT WITH RESPECT TO THE SECOND OBJECT
432

ACTIVATE THE COLLISION DETECTION OPERATION FOR A SECOND PORTION OF THE SECOND OBJECT
434

APPLY A FORCE TO THE FIRST OBJECT AND/OR THE SECOND OBJECT TO AT LEAST REDUCE THE INTERSECTION OF THE FIRST OBJECT AND THE SECOND OBJECT AT THE SECOND TIME
436

FIG. 4

TECHNIQUES FOR RECOVERING FROM INTERSECTIONS

BACKGROUND

Computer simulations (sometimes referred to as simulations) reproduce the behavior of a system using mathematical models. For example, a simulation may use a computer program, which relies on one or more mathematical models, to analyze a system at a time step to determine how the system should look at the time step. In some cases, the simulation may be used to generate (sometimes referred to as render) an image.

The simulation can include position information that is identified for one or more objects at the time step. The position information can be based on defined position information (e.g., that is set by an animator) and/or forces (e.g., identified by one or more mathematical models) associated with the simulation. In some examples, the position information can indicate that objects are going to collide and/or intersect such that a result of the simulation would appear unrealistic.

While there has been scholarship regarding how to accurately and efficiently prevent and/or fix intersections, many solutions require particular assumptions to hold true, such as never allowing intersections to occur. Unfortunately, such assumptions cannot always hold true in practice. Therefore, there is a need in the art for improved techniques for handling intersections.

BRIEF SUMMARY

Provided are methods, systems, and computer-program products for recovering from intersections during a simulation of an animated scene when a collision detection operation (e.g., discrete collision detection or continuous collision detection (CCD)) is active. For example, the collision detection operation can be selectively activated and deactivated during the simulation of one or more objects for a time step based on an intersection analysis, which can identify intersections of the one or more objects for the time step. Once the collision detection operation is deactivated, a collision response can apply one or more forces to intersecting portions of the one or more objects to eliminate the intersections of the one or more objects (sometimes referred to as fixing the intersections or recovering from the intersections). For example, a portion of a cloth that is in a state of intersection can be configured such that the collision detection operation is not performed on the portion, thereby allowing the cloth to be removed from inside of another object by a collision response algorithm. Without the collision detection operation deactivated, the collision response algorithm would be prevented from fixing the intersection because the collision detection operation would not allow the cloth to pass back through a surface (e.g., a solid plane such as an animated object, another cloth, or the cloth itself) that the cloth is intersecting.

Another problem arises when a first object has penetrated deep into a second object (e.g., a solid plane such as an animated object, a cloth, or the first object itself). While the first object is typically pushed out of a closest point on a surface of the second object, the closest point can be incorrect when the first object has penetrated deep enough into the second object. Therefore, rather than pushing the first object out an incorrect point, a proximity query can determine whether the first object will exit the second object near where the intersection analysis identifies an intersection of the first object and the second object. If the exit is incorrect, the first object can be prevented from being pushed out that point.

Numerous benefits are achieved by way of the present disclosure over conventional techniques. For example, embodiments of the present disclosure can prevent simulation artifacts in animation that would not occur with real objects. The embodiments can also ensure that simulations are properly corrected.

According to embodiments described above, a first method may be provided for performing a simulation. The first method may include receiving a position of a first object and a second object at a first time and identifying an intersecting portion at the first time. The intersecting portion may include a portion of the first object that is intersecting a first portion of the second object. The first time may be an initial state for the simulation. In addition to, or in the alternative, the position of the first object and the second object at the first time may be determined using a simulation of the first object and the second object at the first time. In some examples, the first object is a first portion of an object and the second object is a second portion of the object.

The first method may further include performing a simulation of the first object from the first time to a second time. Performing the simulation includes deactivating a collision detection operation for the first portion of the second object with respect to the first object and the portion of the first object with respect to the second object. Performing the simulation also includes activating the collision detection operation for a second portion of the second object, thereby preventing the first object from penetrating the second portion of the second object. And in some examples, performing the simulating further includes applying a force to the first object or the second object to at least reduce the intersection of the first object and the second object at the second time. In some examples, the force may an attractive force that is applied to the first portion and/or the second portion to cause the first portion or the second portion to move in a direction to eliminate the intersecting portion. In other examples, the force is applied to a portion other than the first portion and the second portion.

In some examples, the first method further includes rendering the first object and the second object at the second time for display. When rendering, the first object does not intersect the second object due to the processes describes above.

According to embodiments described above, a second method may be provided for performing a simulation, the second method either used separate from or in combination with the first method described above. The second method may include receiving a position of a first object and a second object at a time and identifying an intersecting portion at the time. The intersecting portion may include a portion of the first object that is intersecting a portion of the second object. In some embodiments, the first object is a first portion of an object and the second object is a second portion of the object.

The second method may further include determining a first part of the first object that is included in the intersecting portion, where a closest point on a surface of the second object to the first part is included in the intersecting portion. The second method may further include determining a second part of the first object that is included in the intersecting portion, where a closest point on a surface of the second object to the second part is not included in the intersecting portion. In some embodiments, a distance between the second part and the closest point on the surface of the second object to the second part is less than a distance between the second part and the closest point on the surface of the second object to the first part.

The second method may further include performing a simulation of the first object and the second object, where performing the simulation includes applying a force to the first part and not applying a force to the second part such that the second part is moved by the force applied to the first part. In some embodiments, applying the force reduces a size of the intersecting portion.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 3A illustrates an example of a state of a scene at time t, where the state includes an intersection. FIG. 3B illustrates an example of a state of a scene at a time t+1 with a detection of an intersection that was present in a previous state. FIG. 3C illustrates an example of a state at time t+1 with a response to an intersection.

FIG. 4 illustrates an example of a process for recovering from intersections during a simulation.

DETAILED DESCRIPTION

A simulation may determine an appearance of an animated scene at a particular time step. Based on the simulation, an image at the particular time step may be rendered and displayed. However, problems can arise in the simulation when two solid objects are overlapping or intersecting each other. Such an image showing these artifacts might not appear realistic.

I. Collision Detection

Collision detection typically refers to the computational problem of detecting an intersection (sometimes referred to as an overlap) of one or more objects (e.g., an object can intersect itself or intersect another object). Two methodologies for dealing with collisions include: (1) fixing intersections during a simulation and (2) fixing intersections after a simulation. These two methodologies are typically not used together because it is assumed if you fix intersections during a simulation that there would be no reason to fix intersections after the simulation.

Collision detection (e.g., discrete collision detection or continuous collision detection (CCD)) is an operation that fixes an intersection during a simulation at a time step. In particular, a collision detection operation can perform a first simulation to determine whether an intersection of one or more objects is to occur. If an intersection is to occur, the CCD operation can cause the one or more objects to be simulated without the intersection occurring (e.g., a second simulation). In such an example, a result of the second simulation can be used to render a frame for the time step. While there are many different ways to perform a collision detection operation, it should be recognized that the collision detection operation can prevent an object from being simulated in an intersection state (sometimes referred to as penetration state). Accordingly, simulators that employ a collision detection operation assume that objects are in a penetration free state before and after a simulation.

Figure 1C:
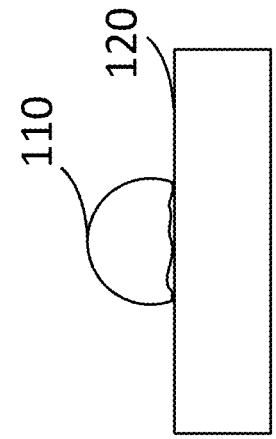
FIG. 1C illustrates an example of a state of a scene at time t+1 with a response to a detection of an intersection.
Figure 1B:
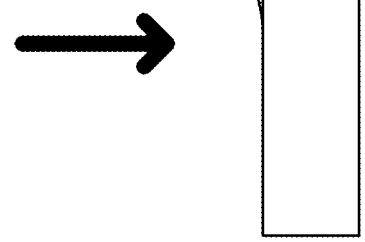
FIG. 1B illustrates an example of a state of a scene at time t+1 with a detection of an intersection.
Figure 1A:
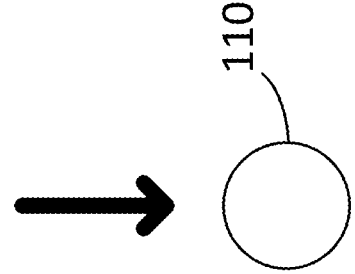
FIG. 1A illustrates an example of a state of a scene at time t.

FIGS. 1A-1C illustrate an example of a collision detection operation being performed during a simulation from a first time to a second time. In particular, FIG. 1A illustrates an example of a state of a scene at time t. In the state, a first object 110 is moving toward a second object 120, as indicated by the arrows.

FIG. 1B illustrates an example of a state of the scene (illustrated in FIG. 1A) at time t+1 with a detection of an intersection. In particular, the first object 110 intersects the second object 120. The state of FIG. 1B can be based on a velocity and direction of the velocity of the first object 110 between time t and time t+1. When a collision detection operation is active, an intersection (e.g., an intersecting portion 130) can be identified in the state of FIG. 1B.

While FIG. 1B illustrates the first object 110 barely intersecting the second object 120, it should be recognized that the intersection can be more or less than what is shown. It should also be recognized that the collision detection operation can be active even when the first object 110 is estimated to move through the second object 120 (and there is no actual intersection at time t+1). In such a situation, it can be determined that the first object 110 would intersect the second object 120 along the way to a position at time t+1.

FIG. 1C illustrates an example of a state of the scene (illustrated in FIGS. 1A and 1B) at time t+1 with a response to the detection of the intersection described in FIG. 1B. In the state illustrated in FIG. 1C, the first object 110 does not intersect the second object 120 anymore. To arrive at FIG. 1C, the first object 110 may be moved to ensure that there is not an intersection between the first object 110 and the second object 120. The movement of the first object 110 can be based on a closest point of a surface of the second object to one or more intersecting points of the intersecting portion 130. For example, each intersection point of the intersecting portion 130 can have a force applied to it in a direction of the closest point of the surface of the second object. In such examples, at least a portion of the first object 110 can be moved above the second object 120. In other examples, a direction that the first object 110 is moved can be based on a direction of movement of the first object 110 between time t and time t+1.

II. Intersection Analysis

Global Intersection Analysis (GIA) is an operation that identifies intersections in a state at a particular time. Therefore, GIA is not used in conjunction with a collision detection operation because the collision detection operation is supposed to prevent intersections from occurring in a state at a particular time.

In some examples, an object can be represented as a mesh, the mesh being formed by a set of vertices, where pairs of vertices of the set of vertices define edges. In such examples, points of the meshes may be checked to determine if the points of the meshes intersect with another mesh, and an intersection path may be traced where the intersection occurs. The intersection path can indicate where the points intersect.

For the intersection path, the mesh vertices that are surrounded by the intersection path (i.e. those vertices lying "inside" the intersection path) can be identified. Identified mesh vertices can be moved to eliminate the intersection. For example, a force can be applied to the identified mesh vertices to move the identified mesh vertices toward a closest point to eliminate the intersection. One example of GIA is described in U.S. Pat. No. 7,355,600, which is hereby incorporated by reference in its entirety, for all purposes.

Figure 2B:
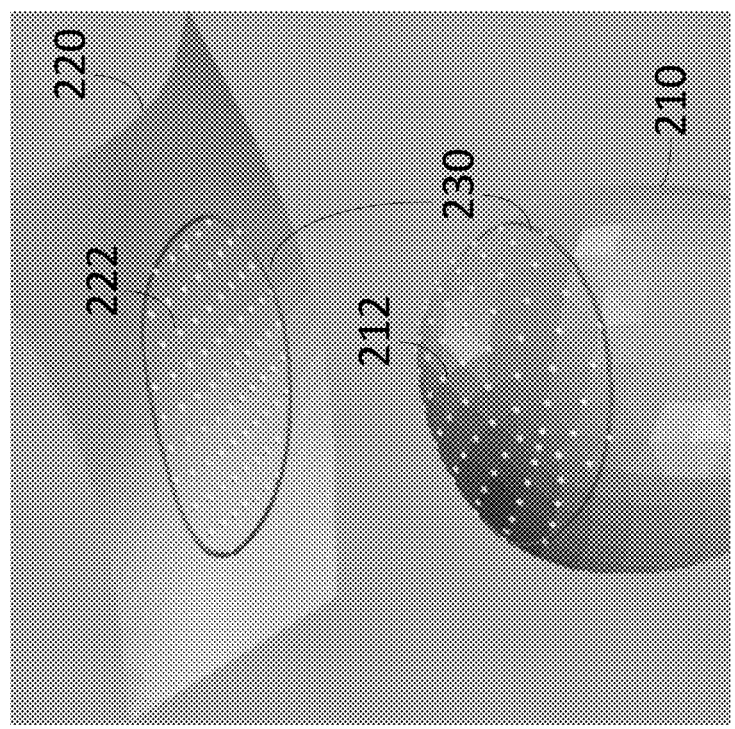
FIG. 2B illustrates an example of an exploded view of the first object intersecting the second object.
Figure 2A:
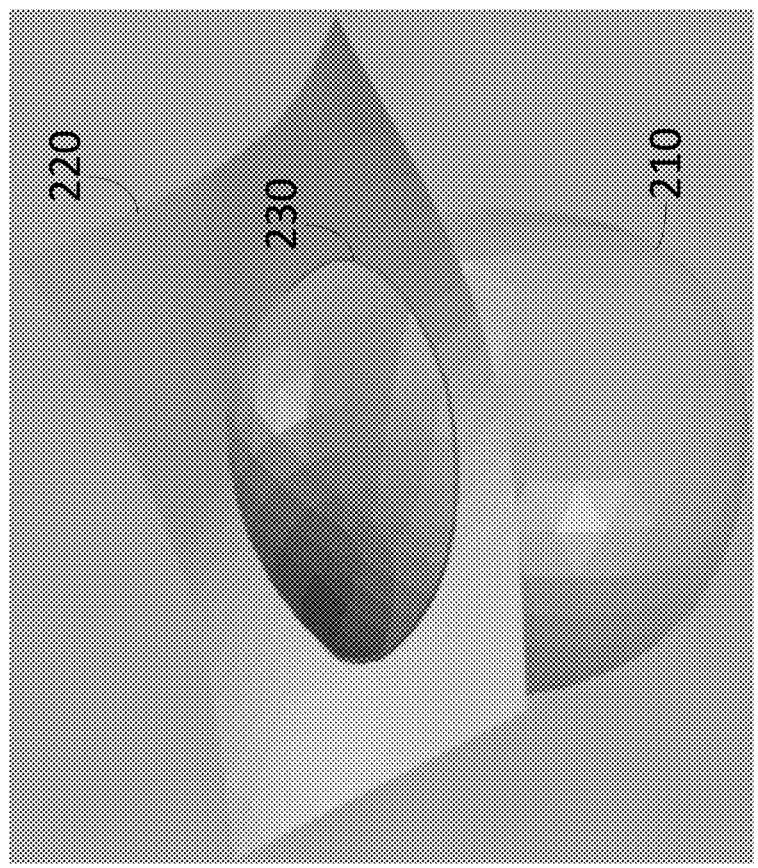
FIG. 2A illustrates an example of a first object intersecting a second object.

FIG. 2A illustrates an example of a first object 210 (e.g., a ball) intersecting a second object 220 (e.g., a cloth). In some examples, the intersection can occur because the first object 210 and the second object 220 were configured by an animator to intersect, either intentionally or unintentionally. For example, the first object 210 can be placed inside of the second object 220 when configuring a first scene, before a simulation has occurred. In other examples, a path of the first object 210 can cause the first object 210 to be pushed into the second object 220 because the first object 210 has no other place to go. In such examples, rather than an error being produced, the first object 210 can be made to intersect the second object 220, even though such an intersection would not happen in reality.

In some examples, an intersection path 230 can be determined as described above. The intersection path 230 can indicate where the first object 210 intersects the second object 220. In some examples, the intersection can occur because the first object 210 is set at a velocity that would cause the first object 210 to overlap the second object 220. In such examples, collision detection, which would typically prevent the intersection, may not be active for the simulation.

FIG. 2B illustrates an example of an exploded view of the first object 210 intersecting the second object 220. In the example, the first object 210 includes one or more vertices 212 that are included with and/or inside of the intersection path 230. The second object 220 can also include one or more vertices 222 that are included with and/or inside of the intersection path 230.

To disentangle the two meshes, the one or more vertices 222 of the second object 220 may pass back through the one or more vertices 212 of the first object 210 (or vice versa). For example, if the first object 210 and the second object 220 are cloth meshes, each of the one or more vertices 212 can have an attractive force applied between them and corresponding vertices of the one or more vertices 222.

In some examples, each of the one or more vertices 222 can also have an attractive force applied between them and the one or more vertices 212. By applying attractive forces, the intersecting vertices can be eliminated between the first object 210 and the second object 220. And vertices of the first object 210 and the second object 220 that are not surrounded by the intersection path 230 may exchange standard repulsive forces. If the first object 210 is not a cloth mesh (such as an animated object), the first object 210 can have an attractive force that causes the second object 220 to move outside of the first object 210.

In some examples, the forces applied to one or more objects can be based on what is identified as inside of the intersection path. For example, an area identified as inside of the intersection path can have forces (e.g., attractive forces) applied to them that are not applied to areas outside of the intersection path. In such examples, the area identified as inside of the intersection path can be determined based on an amount of area that is on one side of the intersection. For example, if more of an object is on a particular side of an intersection, it can be determined that the particular side is outside of the intersection. In such an example, the determination can be based on the fact that an intersection would be identified before the intersection becomes deep enough for a portion of the object intersecting is more than a portion of the object not intersecting. In some examples, the amount of area that is on one side of the intersection can be determined based on a distance from a point of a surface of the object.

III. Fixing Intersections while Collision Detection is Active

As mentioned above, simulators that employ a collision detection operation may assume that cloth is always in a penetration free state. However, this assumption breaks down in reality. For example, an intersection between two objects may occur due to starting positions of the two objects at the beginning of the simulation, an animator causing the intersection during a simulation, or the like. For example, an artist can configure a scene such that an intersection is present before the collision detection operation is active. For another example, cloth can be forced inside of a body (e.g., due to animated objects pinching together, leaving no room for the cloth). And when such intersections are present in a simulation, the collision detection operation can prevent the intersections from being fixed.

Some embodiments described herein can handle cloth intersections during a simulation. For example, a collision detection operation can be selectively activated and deactivated for portions of objects during a simulation based on a global intersection analysis (GIA), which can identify intersecting regions between the objects. For example, portions of a cloth that are in a state of intersection can be configured such that the collision detection operation is not active for the portions, thereby allowing a collision response algorithm to fix the intersections. Without the collision detection operation deactivated, the collision response algorithm would be prevented from fixing the intersection because the collision detection operation would not allow the cloth to pass back through a surface (e.g., a solid plane such as an animated object, another cloth, or the cloth itself) that the cloth is intersecting. In some examples, a flag can be associated with each point of an object to identify whether the collision detection operation is active or inactive for the point of the object.

In some examples, the collision response algorithm can apply a force to one or more of the intersecting objects. For example, an attractive force can be applied to intersecting portions of one or more of the intersecting objects such that the intersection is at least partially eliminated. The attractive force can cause a first intersecting object to move toward a second intersecting object. For another example, a force can be applied to non-intersecting portions of the intersecting objects such that the force causes the intersection to be at least partially eliminated.

In some examples, a direction of the force can be based on what is identified as being intersecting, and what point of a surface of an object intersecting another object is closest to a point of a surface of the other object. For example, a distance can be calculated between an intersecting portion of a first object and a point of a surface of a second object. The distance can indicate how far one or more intersecting objects need to be moved to eliminate the intersection. The closest point of the surface of the second object can be determined to be a direction for the force so that the intersection of the objects is removed using the closest point of the surface of the second object.

In some examples, the GIA can be performed once per time step. In other examples, the GIA can be performed during a time step that a frame is going to be rendered. In either example, the GIA can identify intersecting portions between a first object and a second object (which may be portions of the same object) at a current time step (referred to as a first time step).

In some examples, a collision detection operation can identify portions of an object in a simulation for a future time step (referred to as a second time step) where the collision detection operation has identified an intersection. In such examples, if the portions of the object have been identified in the first time step by the GIA as intersecting portions, the collision detection operation can be deactivated such that it is not performed on the portions, and the portions are allowed to intersect each other during the simulation at the second time step. This allows collisions for points that start inside the mesh at the beginning of the time step to escape. If the collision detection operation remained active for the portions, as would be done in a typical execution of the collision detection operation, the collision detection operation would prevent an object from passing through a surface, and the intersection would remain.

If the first object is cloth and the second object is an object animated by an animator, the GIA can be performed on the second object at the second time step. If it is determined that the first object intersects the second object, an additional determination of whether the second object was identified as intersecting the first object at either the first time step or the second time step can be made. If so, the collision detection operation can be deactivated such that it is not performed for the intersecting portions of the first object and the second object. This allows collisions that would be unresolvable in pinching scenarios to be ignored.

FIG. 3A illustrates an example of a state at time t, where the state includes an intersection. For example, a first object 310 may be intersecting a second object 320 at time t. In the example, the first object 310 and the second object 320 can each include an intersecting portion 330, which can be where the first object 310 intersects the second object 320. However, rather than as described with FIG. 1A, the intersection can be present in an initial state, rather than in a simulation of positions of objects at a subsequent time step. The intersection can also be present in a time step that was generated based on a simulation. For example, the intersection may have been caused by pinching or other condition that was unavoidable during the simulation.

FIG. 3B illustrates an example of a state of a scene at a time t+1 with a detection of an intersection that was present in the state at time t (illustrated in FIG. 3A). For example, the state may include the first object 310 and the second object 320 for a second time step (which can be rendered as a second frame), where the first object 310 is still intersecting the second object 320. In the example, the first object 310 and the second object 320 can each include an intersecting portion 330, which can be where the first object 310 intersects the second object 320.

In some examples, after identifying the intersecting portion 330, a collision detection operation can be deactivated for the intersecting portion 330 when simulating the state at time t+1 while the rest of the first object 310 and the second object 320 may have the collision detection operation activated. For example, the intersecting portion 330 of the first object 310 can have the collision detection operation deactivated, and the intersecting portion 330 of the second object 320 can have the collision detection operation deactivated. In addition, portions of both the first object 310 and the second object 320 that are not included in the intersecting portion 330 can have the collision detection operation activated such that the first object 310 and the second object 320 may not intersect each other in the portions of both the first object 310 and the second object 320 that are not included in the intersecting portion 330. In other examples, the entire first object 310 and the entire second object 320 may have the collision detection operation deactivated while a third object (which can be in the same scene as the first object 310 and the second object 320) may have the collision detection operation activated.

By selectively deactivating the intersecting portion 330, the simulation can allow the first object 310 and the second object 320 to intersect such that the first object 310 may no longer intersect the second object 320. For example, one or more forces can be applied to the intersecting portion 330 of the first object 310 and/or the intersecting portion 330 of the second object 320 that cause the intersecting portion 330 to be eliminated, as described herein.

Selectively deactivating the collision detection operation can result in FIG. 3C for a second time step, which illustrates an example of a second simulation of the first object 310 and the second object 320, where the first object 310 does not intersect the second object 320. In some examples, the second time step can be set to be rendered to produce a second frame.

FIG. 4 illustrates an example of a process 400 for recovering from intersections during a simulation. The process 400 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 400 is intended to be illustrative and non-limiting. Although FIG. 4 depicts the various processing steps occurring in a particular sequence or order, this is not intended to be limiting. In certain embodiments, the steps may be performed in some different order or some steps may also be performed in parallel.

In the embodiment depicted in FIG. 4, the process 400 may be triggered at 410 when a position of a first object and a second object at a first time is received. The position can indicate where the objects are located at the first time. In some embodiments, a velocity and a direction of the velocity can also be provided for the first object and the second object such that a simulation can be performed to determine the position of the first object and the second object at a future time. In certain embodiments, the first time may an initial state for the simulation. In other embodiments, the position of the first object and the second object at the first time may be determined using a simulation of the first object and the second object at the first time. The first object may be a first portion of an object, where the second object is a second portion of the object.

At 420, the process 400 may further include identifying an intersecting portion at the first time, the intersecting portion including a portion of the first object that is intersecting a first portion of the second object.

At 430, the process 400 may further include performing a simulation of the first object from the first time to a second time. Performing the simulation may include the following operations: at 432 deactivating a collision detection operation for the first portion of the second object with respect to the first object and the portion of the first object with respect to the second object; at 434 activating the collision detection operation for a second portion of the second object, thereby preventing the first object from penetrating the second portion of the second object; and at 436 applying a force to the first object or the second object to at least reduce the intersection of the first object and the second object at the second time.

In some embodiments, the force may be an attractive force that is applied to the first portion and/or the second portion to cause the first portion or the second portion to move in a direction to eliminate the intersecting portion. In other embodiments, the force may be applied to a portion other than the first portion and the second portion.

The process 400 may further include rendering the first object and the second object at the second time for display, where the first object does not intersect the second object in the rendering.

IV. Deep Intersections

As described above, a force can be applied to points of an intersecting portion of a first object in a direction based on a proximity to a point on a surface of a second object. The force can be intended to remove the intersection between the first object and the second object. However, a problem can arise when the point on the surface of the second object is not an intersecting point between the first object and the second object. In such cases, the force pushing a point of the first object toward a non-intersecting point may not properly fix the intersection. For example, the force may cause there to be a portion of the first object on two or more sides of the second object. For another example, the force may be opposed by another force that is applied to a different intersecting point of the first object, the different intersecting point having a closest point on the surface of the second object included in the intersecting portion.

In addition, a collision detection operation can cause the force to be ineffective at removing the intersection. For example, the collision detection operation may prevent the force from pushing the portion of the object out of the non-intersecting point because the non-intersecting point may not have the collision detection operation deactivated based on embodiments described herein. Accordingly, deep intersections can cause problems for simulations.

Embodiments described below can handle deep intersections during a simulation. In particular, a determination can be made regarding a closest point of a surface of a second object to an intersecting portion of a first object. If the closest point is an intersecting point, a normal operation to fix the intersection can be applied (as described above). However, if the closest point is not an intersecting point, a force for fixing the intersection may not be applied to the intersecting portion. Instead, the intersecting portion can follow (or be dragged/moved) by another intersecting portion of the first object, the other intersecting portion of the first object having an intersecting point as its closest point on a surface of the second object.

Figures 5A, 5B, 5C:
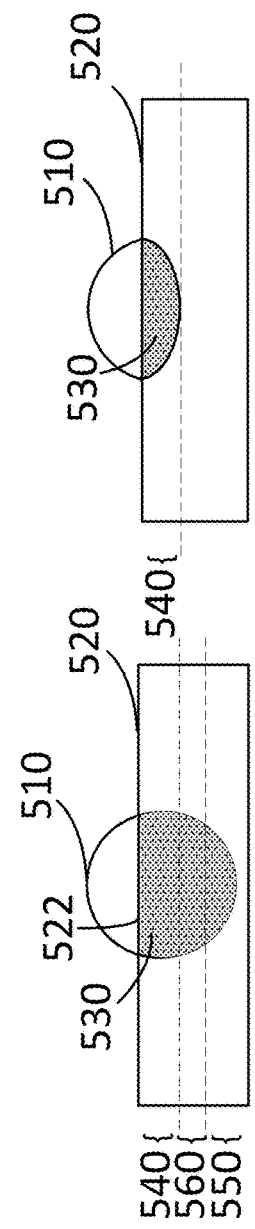
FIG. 5A illustrates an example of a state of a scene at time t with a detection of an intersection.
FIG. 5B illustrates an example of a result of a first response to an intersection in a state of a scene at time t.
FIG. 5C illustrates an example of a result of a second response to an intersection in a state of a scene at time t.

FIG. 5A illustrates an example of a state of a scene at time t with a detection of an intersection. The intersection may be between a first object 510 and a second object 520, where the first object 510 is deeply intersecting the second object 520. The first object 510 can include an intersecting portion 530 (i.e., where the first object 510 intersects the second object 520). In some examples, the intersecting portion 530 can be divided into one or more areas (e.g., a first area 540, a second area 550, and a third area 560).

The first area 540 can be an area of the intersecting portion 530 where each point is closest to a point of a surface of the second object 520 that is within the intersecting portion 530. The second area 550 can be an area of the intersecting portion 530, where each point is closest to a point of a surface of the second object 520 that is not within the intersecting portion 530. The third area 560 can be an area that includes points that are equal distance to a point of a surface of the second object 520 that is not within the intersecting portion 530 and a point of a surface of the second object 520 that is within the intersecting portion 530. For example, the third area 560 can be a midpoint between an intersecting edge and an opposite edge. It should be recognized that more or less areas can be identified in an intersecting portion.

In response to the detection of the intersection, a first response may occur. The first response may be a force that is applied to the first area 530 that corresponds to the first object 510 such that the first area 530 that corresponds to the first object 510 is moved to reduce or eliminate the intersection between the first object 510 and the second object 520. While the force may be applied to the first area 530 that corresponds to the first object 510, no force may be applied to the second area 550 that corresponds to the first object 510 and the third area 560 that corresponds to the first object 510. And because no force is applied to the aforementioned areas, the aforementioned areas may be moved based on the force applied to the first area 530 that corresponds to the first object 510. An example of a result of this movement is illustrated in FIG. 5B; however, it should be recognized that the movement may cause a different result.

FIG. 5B illustrates an example of a result of a first response to an intersection in a state of a scene at time t. The state can include the first object 510 and the second object 520 described above for FIG. 5A. In FIG. 5B, the first object 510 may have been moved in relation to FIG. 5A as a result of the first response as described above; however, the first object 510 may still be intersecting the second object 520. The first response may result in the first object 510 and the second object 520 with less intersection than illustrated in FIG. 5A. In some examples, the first object 510 can still include an intersecting portion 530, where the first object 510 intersects the second object 520. However, it should be recognized that there may not be any intersecting portion after the first response. In some examples, the intersecting portion 530 can be included in the first area 540.

In some examples, the intersecting portion 530, which is included in the first area 540, can have a second response applied to it, the result of which is illustrated in FIG. 5C. The second response may include a force applied to the intersecting portion 530 associated with the first object 510 that pushes the first object 510 out of the second object 520. In FIG. 5C, the first object 510 does not intersect the second object 520. While FIGS. 5A-5C describe a two-response process for fixing deep intersections, it should be recognized that there may be more or less responses.

Figure 6:
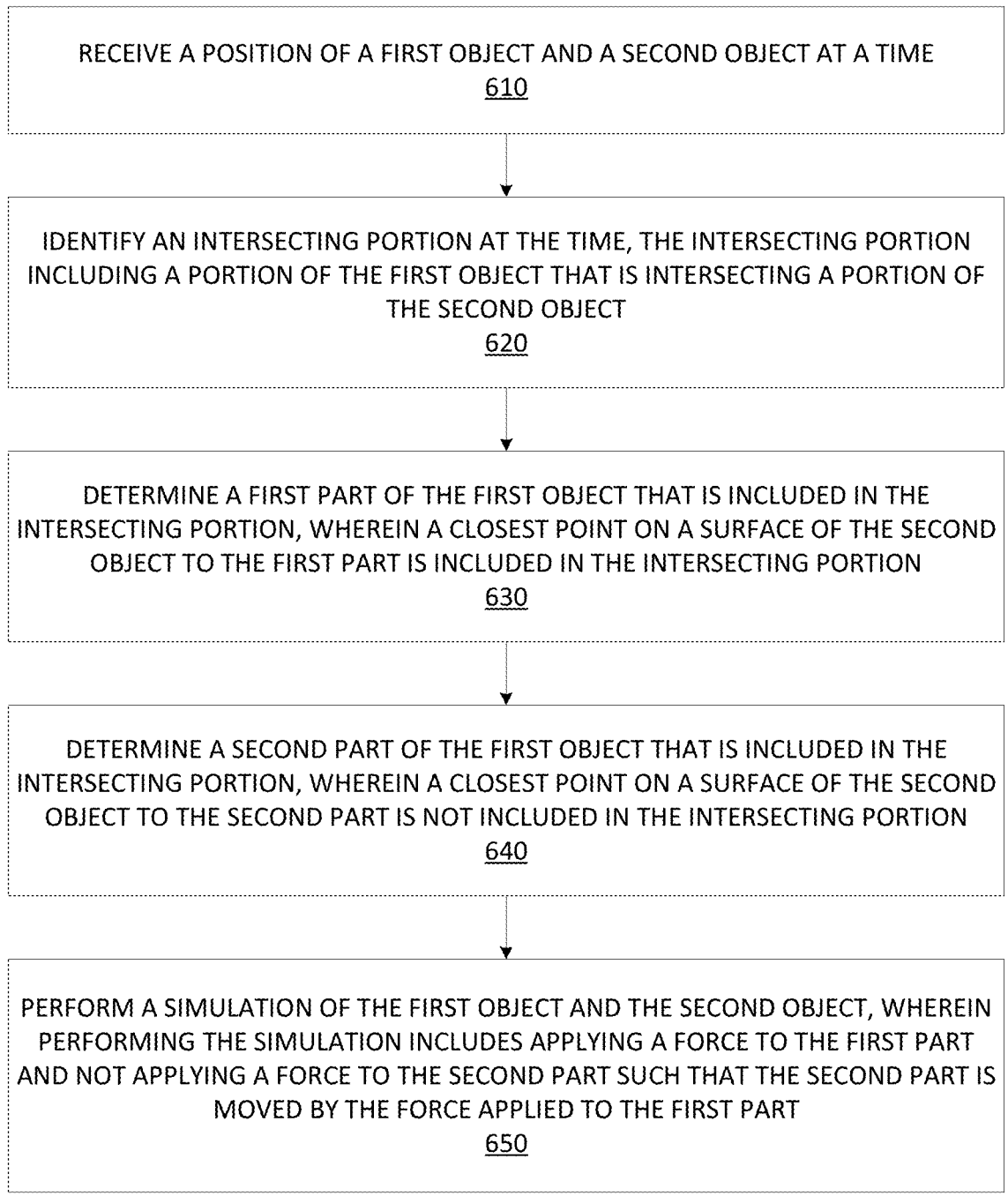
FIG. 6 illustrates an example of a process for recovering from deep intersections during a simulation.

FIG. 6 illustrates an example of a process 600 for recovering from deep cloth intersections during a simulation. The process 600 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 600 is intended to be illustrative and non-limiting. Although FIG. 6 depicts the various processing steps occurring in a particular sequence or order, this is not intended to be limiting. In certain embodiments, the steps may be performed in some different order or some steps may also be performed in parallel.

In the embodiment depicted in FIG. 6, the process 600 may be triggered at 610 when a position of a first object and a second object at a time is received. The position can indicate where the objects are located at the first time. In some embodiments, a velocity and a direction of the velocity can also be provided for the first object and the second object such that a simulation can be performed to determine the position of the first object and the second object at a future time. In certain embodiments, the first time may an initial state for the simulation. In other embodiments, the position of the first object and the second object at the first time may be determined using a simulation of the first object and the second object at the first time. The first object may be a first portion of an object, where the second object is a second portion of the object.

At 620, an intersecting portion at the time may be identified, the intersecting portion including a portion of the first object that is intersecting a portion of the second object. At 630, a first part of the first object that is included in the intersecting portion may be determined, where a closest point on a surface of the second object to the first part is included in the intersecting portion. At 640, a second part of the first object that is included in the intersecting portion may be determined, where a closest point on a surface of the second object to the second part is not included in the intersecting portion. A distance between the second part and the closest point on the surface of the second object to the second part may be less than a distance between the second part and the closest point on the surface of the second object to the first part.

At 650, a simulation may be performed of the first object and the second object. Performing the simulation may include applying a force to the first part and not applying a force to the second part such that the second part is moved by the force applied to the first part. Applying the force may reduce a size of the intersecting portion.

V. System

Figure 7:
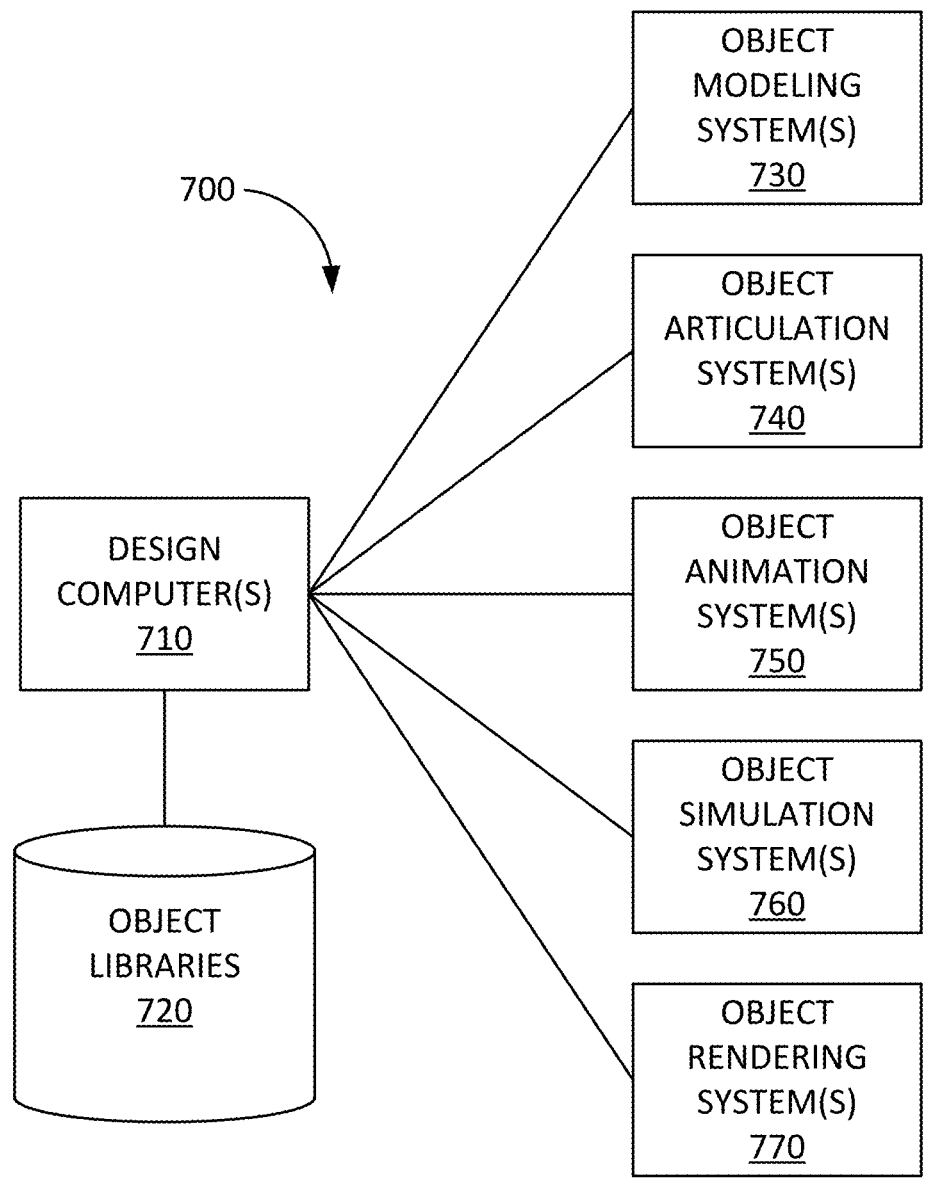
FIG. 7 is a simplified block diagram of system for creating computer graphics imagery (CGI) and computer-aided animation that may implement or incorporate various embodiments.

FIG. 7 is a simplified block diagram of system 700 for creating computer graphics imagery (CGI) and computer-aided animation that may implement or incorporate various embodiments. In this example, system 700 can include one or more design computers 710, object library 720, one or more object modeler systems 730, one or more object articulation systems 740, one or more object animation systems 750, one or more object simulation systems 760, and one or more object rendering systems 770. Any of the systems 730-770 may be invoked by or used directly by a user of the one or more design computers 710 and/or automatically invoked by or used by one or more processes associated with the one or more design computers 710. Any of the elements of system 700 can include hardware and/or software elements configured for specific functions.

The one or more design computers 710 can include hardware and software elements configured for designing CGI and assisting with computer-aided animation. Each of the one or more design computers 710 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 710 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 710 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 710 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 710 acting as an animator may employ one or more systems or tools to specify motion and position of one or more objects over time to produce an animation.

Object library 720 can include elements configured for storing and accessing information related to objects used by the one or more design computers 710 during the various stages of a production process to produce CGI and animation. Some examples of object library 720 can include a file, a database, or other storage devices and mechanisms. Object library 720 may be locally accessible to the one or more design computers 710 or hosted by one or more external computer systems.

Some examples of information stored in object library 720 can include an object itself, metadata, object geometry, object topology, rigging, control data, animation data, animation cues, simulation data, texture data, lighting data, shader code, or the like. An object stored in object library 720 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 730 can include hardware and/or software elements configured for modeling one or more objects. Modeling can include the creating, sculpting, and editing of an object. In various embodiments, the one or more object modeling systems 730 may be configured to generate a model to include a description of the shape of an object. The one or more object modeling systems 730 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality.

Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 730 may further generate model data (e.g., 2D and 3D model data) for use by other elements of system 700 or that can be stored in object library 720. The one or more object modeling systems 730 may be configured to allow a user to associate additional information, metadata, color, lighting, rigging, controls, or the like, with all or a portion of the generated model data.

The one or more object articulation systems 740 can include hardware and/or software elements configured to articulating one or more computer-generated objects. Articulation can include the building or creation of rigs, the rigging of an object, and the editing of rigging. In various embodiments, the one or more articulation systems 740 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 740 may further generate articulation data (e.g., data associated with controls or animations variables) for use by other elements of system 700 or that can be stored in object library 720. The one or more object articulation systems 740 may be configured to allow a user to associate additional information, metadata, color, lighting, rigging, controls, or the like, with all or a portion of the generated articulation data.

The one or more object animation systems 750 can include hardware and/or software elements configured for animating one or more computer-generated objects. Animation can include the specification of motion and position of an object over time. The one or more object animation systems 750 may be invoked by or used directly by a user of the one or more design computers 710 and/or automatically invoked by or used by one or more processes associated with the one or more design computers 710.

In various embodiments, the one or more animation systems 750 may be configured to enable users to manipulate controls or animation variables or utilized character rigging to specify one or more key frames of animation sequence. The one or more animation systems 750 generate intermediary frames based on the one or more key frames. In some embodiments, the one or more animation systems 750 may be configured to enable users to specify animation cues, paths, or the like according to one or more predefined sequences. The one or more animation systems 750 generate frames of the animation based on the animation cues or paths. In further embodiments, the one or more animation systems 750 may be configured to enable users to define animations using one or more animation languages, morphs, deformations, or the like.

The one or more object animation systems 750 may further generate animation data (e.g., inputs associated with controls or animation variables) for use by other elements of system 700 or that can be stored in object library 720. The one or more object animation systems 750 may be configured to allow a user to associate additional information, metadata, color, lighting, rigging, controls, or the like, with all or a portion of the generated animation data.

The one or more object simulation systems 760 can include hardware and/or software elements configured for simulating one or more computer-generated objects. Simulation can include determining motion and position of an object over time in response to one or more simulated forces or conditions. The one or more object simulation systems 760 may be invoked by or used directly by a user of the one or more design computers 710 and/or automatically invoked by or used by one or more processes associated with the one or more design computers 710.

In various embodiments, the one or more object simulation systems 760 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 760 may be used to simulate the behavior of objects, such as hair, fur, and cloth, in response to a physics model and/or animation of one or more characters and objects within a computer-generated scene.

The one or more object simulation systems 760 may further generate simulation data (e.g., motion and position of an object over time) for use by other elements of system 700 or that can be stored in object library 720. The generated simulation data may be combined with or used in addition to animation data generated by the one or more object animation systems 750. The one or more object simulation systems 760 may be configured to allow a user to associate additional information, metadata, color, lighting, rigging, controls, or the like, with all or a portion of the generated simulation data.

The one or more object rendering systems 770 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 770 may be invoked by or used directly by a user of the one or more design computers 710 and/or automatically invoked by or used by one or more processes associated with the one or more design computers 710. One example of a software program embodied as the one or more object rendering systems 770 can include PhotoRealistic RenderMan, or PRMan, produced by Pixar Animations Studios of Emeryville, Calif.

In various embodiments, the one or more object rendering systems 770 can be configured to render one or more objects to produce one or more computer-generated images or a set of images over time that provide an animation. The one or more object rendering systems 770 may generate digital images or raster graphics images.

In various embodiments, a rendered image can be understood in terms of a number of visible features. Some examples of visible features that may be considered by the one or more object rendering systems 770 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air), shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 770 may further render images (e.g., motion and position of an object over time) for use by other elements of system 700 or that can be stored in object library 720. The one or more object rendering systems 770 may be configured to allow a user to associate additional information or metadata with all or a portion of the rendered image.

Figure 8:
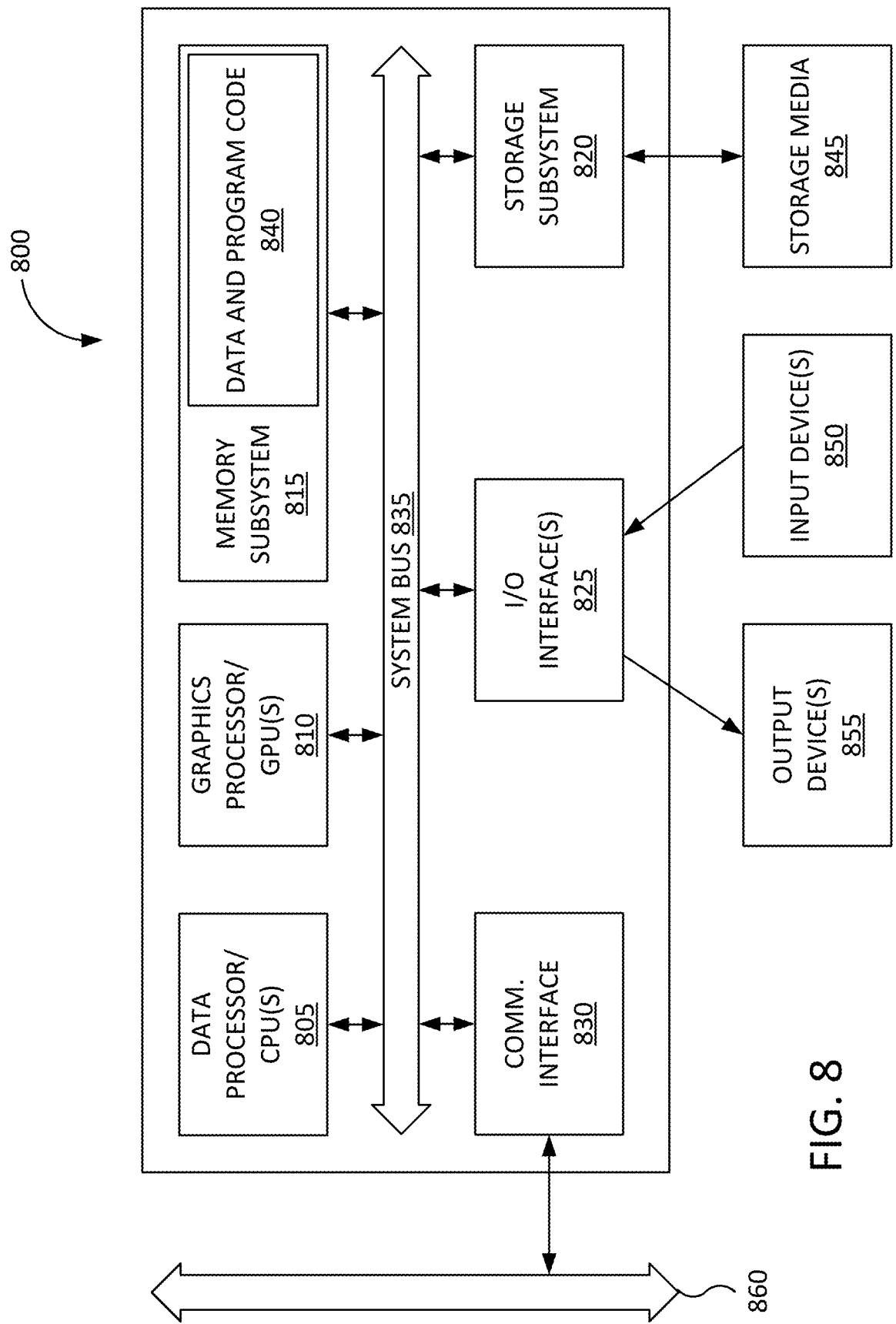
FIG. 8 is a block diagram of computer system.

FIG. 8 is a block diagram of computer system 800. FIG. 8 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 800 and any of its components or subsystems can include hardware and/or software elements configured for performing methods described herein.

Computer system 800 may include familiar computer components, such as one or more data processors or central processing units (CPUs) 805, one or more graphics processors or graphical processing units (GPUs) 810, memory subsystem 815, storage subsystem 820, one or more input/output (I/O) interfaces 825, communications interface 830, or the like. Computer system 800 can include system bus 835 interconnecting the above components and providing functionality, such connectivity as inter-device communication.

The one or more data processors or central processing units (CPUs) 805 can execute logic or program code or for providing application-specific functionality. Some examples of CPU(s) 805 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 810 can execute logic or program code associated with graphics or for providing graphics-specific functionality. GPUs 810 may include any conventional graphics processing unit, such as those provided by conventional video cards. In various embodiments, GPUs 810 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 810 may include any number of registers, logic units, arithmetic units, caches, memory interfaces, or the like.

Memory subsystem 815 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 815 can include data and program code 840.

Storage subsystem 820 can also store information using machine-readable articles, information storage devices, or computer-readable storage media. Storage subsystem 820 may store information using storage media 845. Some examples of storage media 845 used by storage subsystem 820 can include floppy disks, hard disks, optical storage media such as CD-ROMS, DVDs and bar codes, removable storage devices, networked storage devices, or the like. In some embodiments, all or part of data and program code 840 may be stored using storage subsystem 820.

The one or more input/output (I/O) interfaces 825 can perform I/O operations. One or more input devices 850 and/or one or more output devices 855 may be communicatively coupled to the one or more I/O interfaces 825. The one or more input devices 850 can receive information from one or more sources for computer system 800. Some examples of the one or more input devices 850 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 850 may allow a user of computer system 800 to interact with one or more non-graphical or graphical user interfaces to enter a comment, select objects, icons, text, user interface widgets, or other user interface elements that appear on a monitor/display device via a command, a click of a button, or the like.

The one or more output devices 855 can output information to one or more destinations for computer system 800. Some examples of the one or more output devices 855 can include a printer, a fax, a feedback device for a mouse or joystick, external storage systems, a monitor or other display device, a communications interface appropriately configured as a transceiver, or the like. The one or more output devices 855 may allow a user of computer system 800 to view objects, icons, text, user interface widgets, or other user interface elements. A display device or monitor may be used with computer system 800 and can include hardware and/or software elements configured for displaying information.

Communications interface 830 can perform communications operations, including sending and receiving data. Some examples of communications interface 830 may include a network communications interface (e.g. Ethernet, Wi-Fi, etc.). For example, communications interface 830 may be coupled to communications network/external bus 860, such as a computer network, a USB hub, or the like. A computer system can include a plurality of the same components or subsystems, e.g., connected together by communications interface 830 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 800 may also include one or more applications (e.g., software components or functions) to be executed by a processor to execute, perform, or otherwise implement techniques disclosed herein. These applications may be embodied as data and program code 840. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 815 and/or storage subsystem 820.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method for performing simulation, the method comprising:
   receiving a position of a first object and a position of a second object at a first time, the first object represented by a first mesh having a first set of vertices, the second object represented by a second mesh having a second set of vertices;
   identifying an intersecting portion between the first object and the second object at the first time, the intersecting portion including a portion of the first object that is intersecting a first portion of the second object across a first surface of the second object; and
   performing a simulation of the first object from the first time to a second time, wherein performing the simulation includes:
      in response to identifying the intersecting portion, deactivating a collision detection operation for (i) the first portion of the second object with respect to the first object and (ii) the portion of the first object with respect to the second object, while at a same time activating the collision detection operation for a second portion of the second object that is outside the intersecting portion; and
      applying a force to the first object or the second object, wherein the collision detection operation is configured to, when activated, prevent vertices of the first object from crossing the first surface of the second object during simulation, wherein deactivating the collision detection operation for the portion of the first object and the first portion of the second object allows the force to move one or more vertices of the first mesh that are inside the portion of the first object across the first surface of the second object, thereby reducing a size of the intersecting portion between the first object and the second object at the second time, and wherein activating the collision detection operation for the second portion of the second object prevents the force to cause any vertices of the first mesh of the first object to penetrate the second portion of the second object at the second time.

2. The method of claim 1, wherein the force is an attractive force that is applied to one or more vertices of the second mesh that are inside the first portion of the second object and/or the one or more vertices of the first mesh that are inside the portion of the first object to cause the first portion of the second object or the portion of the first object to move in a direction toward the first surface of the second object to reduce the size of the intersecting portion.

3. The method of claim 1, wherein the force is applied to one or more vertices of the second mesh that are inside a third portion of the second object that does not overlap with the first portion and the second portion of the second object.

4. The method of claim 1, further comprising:
   rendering the first object and the second object at the second time for display, wherein the first object does not intersect the second object in the rendering.

5. The method of claim 1, wherein the first time is an initial state for the simulation.

6. The method of claim 1, wherein the position of the first object and the position of the second object at the first time are determined using another simulation of the first object and the second object at the first time.

7. The method of claim 1, wherein the first object is a first sub-portion of a cloth object, and the second object is a second sub-portion of the cloth object.

8. A non-transitory computer-readable storage medium storing a plurality of instructions executable by one or more processors, the plurality of instructions when executed by the one or more processors cause the one or more processors to perform simulation comprising:
   receiving a position of a first object and a position of a second object at a first time, the first object represented by a first mesh having a first set of vertices, the second object represented by a second mesh having a second set of vertices;
   identifying an intersecting portion between the first object and the second object at the first time, the intersecting portion including a portion of the first object that is intersecting a first portion of the second object across a first surface of the second object; and
   performing a simulation of the first object from the first time to a second time, wherein performing the simulation includes:
      in response to identifying the intersecting portion, deactivating a collision detection operation for (i) the first portion of the second object with respect to the first object and (ii) the portion of the first object with respect to the second object, while activating the collision detection operation for a second portion of the second object that is outside the intersecting portion; and
      applying a force to the first object or the second object, wherein the collision detection operation is configured to, when activated, prevent vertices of the first object from crossing the first surface of the second object during simulation, wherein deactivating the collision detection operation for the portion of the first object and the first portion of the second object allows the force to move one or more vertices of the first mesh that are inside the portion of the first object across the first surface of the second object, thereby reducing a size of the intersecting portion between the first object and the second object at the second time, and wherein activating the collision detection operation for the second portion of the second object prevents the force to cause any vertices of the first mesh of the first object to penetrate the second portion of the second object at the second time.

9. The non-transitory computer-readable storage medium of claim 8, wherein the force is an attractive force that is applied to one or more vertices of the second mesh that are inside the first portion of the second object and/or the one or more vertices of the first mesh that are inside the portion of the first object to cause the first portion of the second object or the portion of the first object to move in a direction toward the first surface of the second object to reduce the size of reduce the size of the intersecting portion.

10. The non-transitory computer-readable storage medium of claim 8, wherein the force is applied to one or more vertices of the second mesh that are inside a third portion of the second object that does not overlap with the first portion and the second portion of the second object.

11. The non-transitory computer-readable storage medium of claim 8, wherein the plurality of instructions further comprises:
   rendering the first object and the second object at the second time for display, wherein the first object does not intersect the second object in the rendering.

12. The non-transitory computer-readable storage medium of claim 8, wherein the first time is an initial state for the simulation.

13. The non-transitory computer-readable storage medium of claim 8, wherein the position of the first object and the position of the second object at the first time are determined using another simulation of the first object and the second object at the first time.

14. The non-transitory computer-readable storage medium of claim 8, wherein the first object is a first sub-portion of a cloth object, and the second object is a second sub-portion of the cloth object.

15. A method for performing simulation, the method comprising:
   receiving a position of a first object and a position of a second object at a time, the first object represented by a first mesh having a first set of vertices, the second object represented by a second mesh having a second set of vertices;
   identifying an intersecting portion between the first object and the second object at the time, the intersecting portion including a portion of the first object that is intersecting a portion of the second object across a first surface of the second object;
   identifying a first part of the portion of the first object that is included in the intersecting portion, wherein the first part includes a first point on a first surface of the second object;
   identifying a second part of the portion of the first object that is included in the intersecting portion, wherein a second point on a second surface of the second object to which the second part is closest is not included in the intersecting portion; and
   performing a simulation of the first object and the second object, wherein performing the simulation includes:
      in response to identifying the intersecting portion, deactivating a collision detection operation for the portion of the first object with respect to the second object, while at a same time activating the collision detection operation for other portion of the first object that is outside the intersecting portion; and
      applying a force to one or more vertices of the first mesh that are inside the first part of the portion of the first object and not applying the force to the second part of the portion of the first object such that the second part is moved by the force applied to the first part, wherein the collision detection operation is configured to, when activated, prevent vertices of the first object from crossing the first surface of the second object during simulation, wherein deactivating the collision detection operation for the portion of the first object allows the force to move one or more vertices of the first mesh that are inside the portion of the first object across the first surface of the second object.

16. The method of claim 15, wherein applying the force reduces a size of the intersecting portion.

17. The method of claim 15, wherein the first object is a first sub-portion of a cloth object, and wherein the second object is a second sub-portion of the cloth object.

18. The method of claim 15, wherein applying the force partially eliminates the intersecting portion after the simulation, and the method further comprising:
performing a second simulation of the first object and the second object, the second simulation causing a remaining portion of the intersecting portion present after the second simulation to be removed entirely.

19. The method of claim 15, wherein applying the force eliminates the intersecting portion entirely.

* * * * *